April 14, 1970  R. J. RUPERT  3,506,145
WRIST ACTION MECHANISM FOR A MATERIAL HANDLING
IMPLEMENT ON A POWER LOADER
Filed Oct. 23, 1968  5 Sheets-Sheet 2

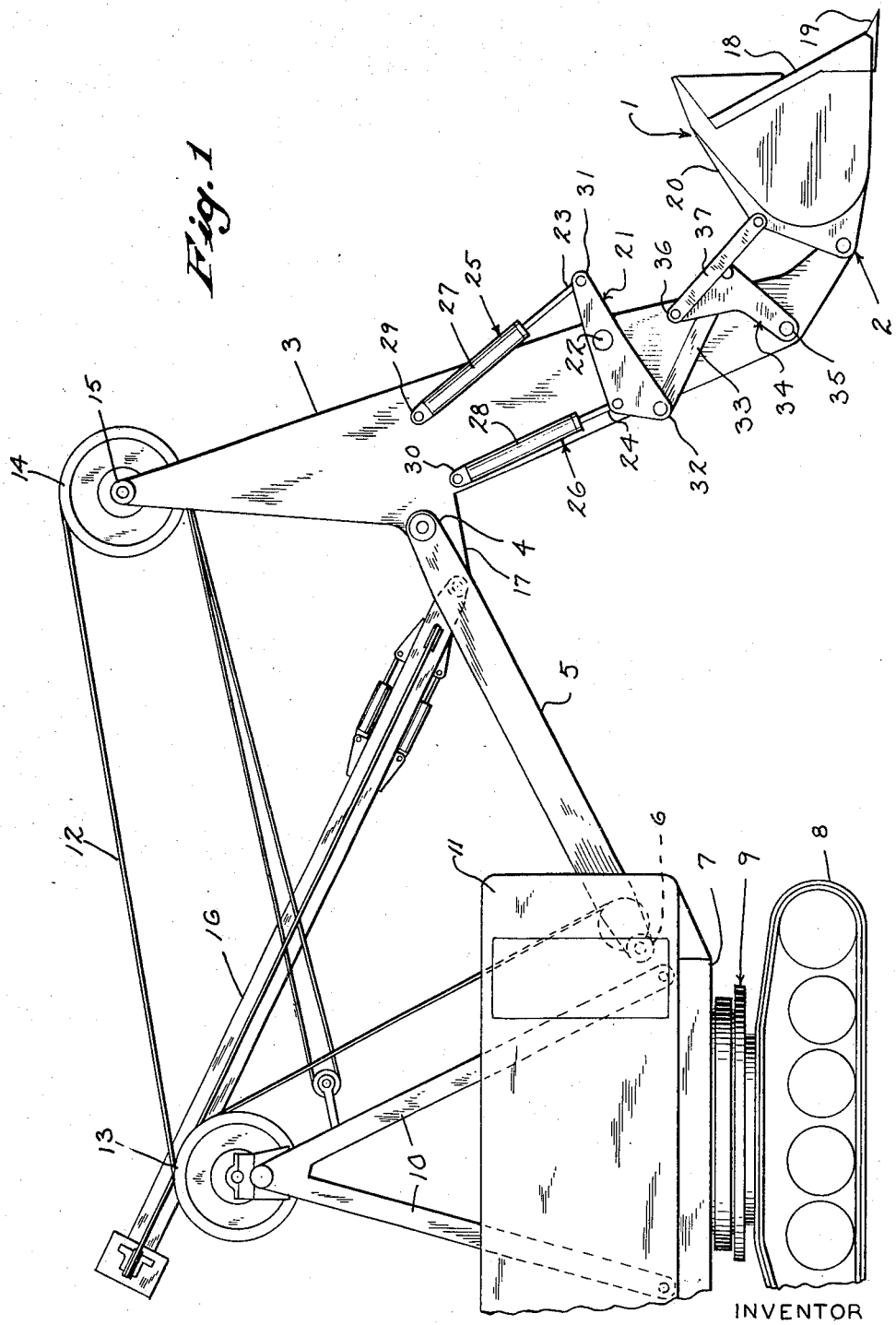
Fig. 1
INVENTOR
ROBERT J. RUPERT
ATTORNEY

INVENTOR
ROBERT J. RUPERT

BY

ATTORNEY

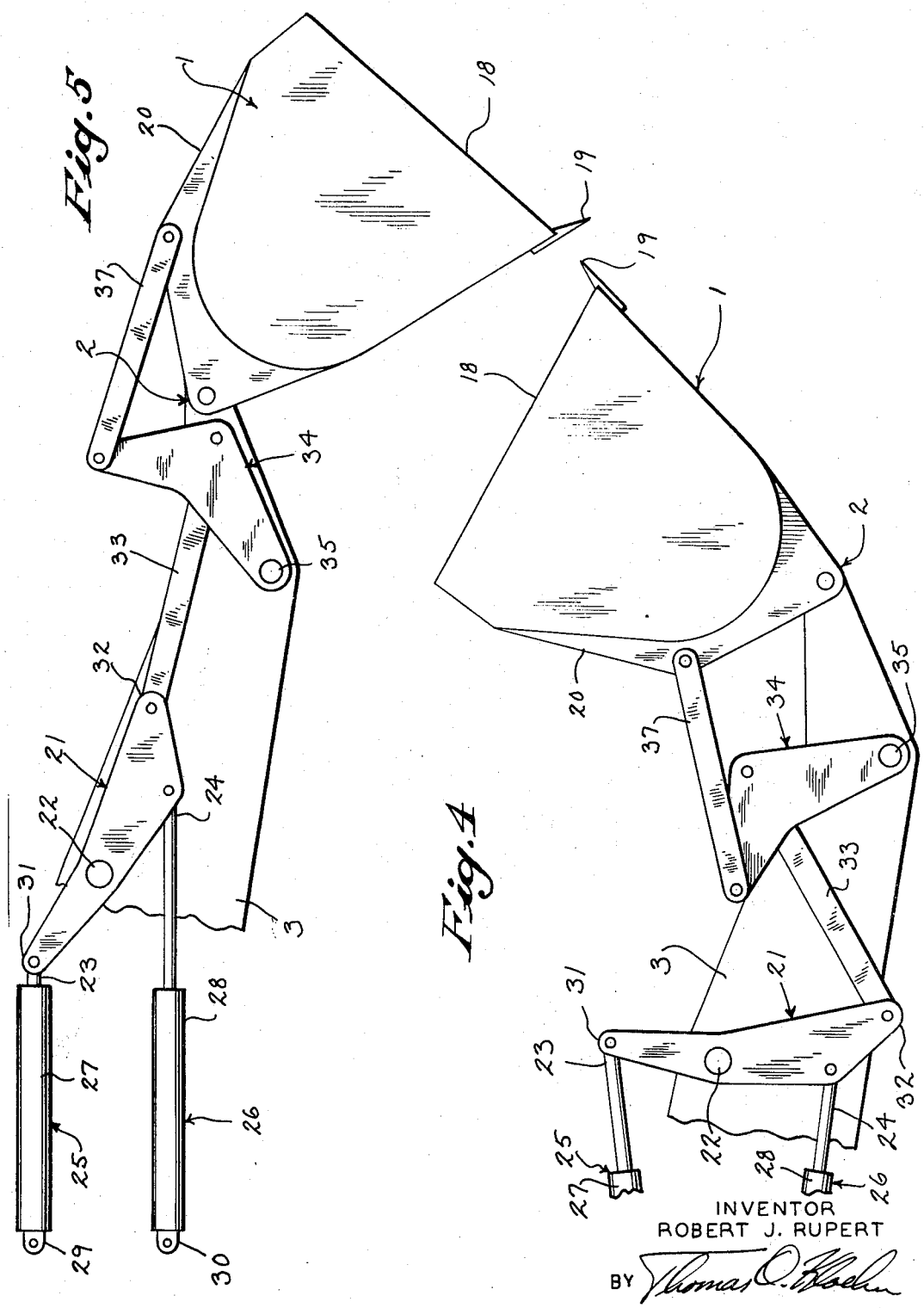

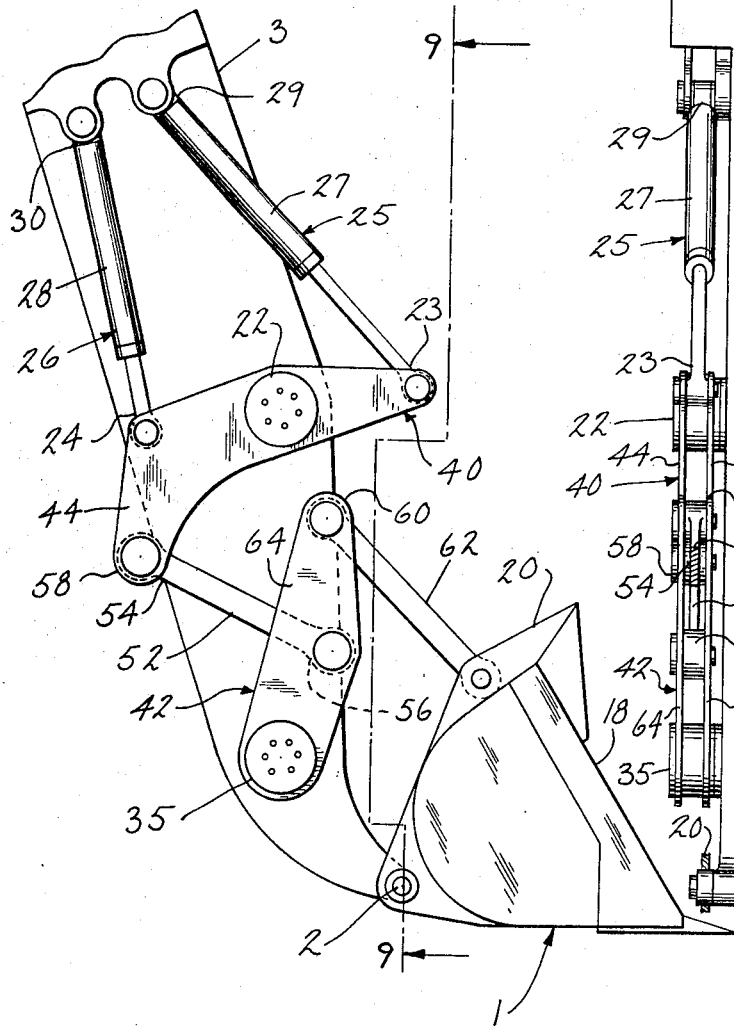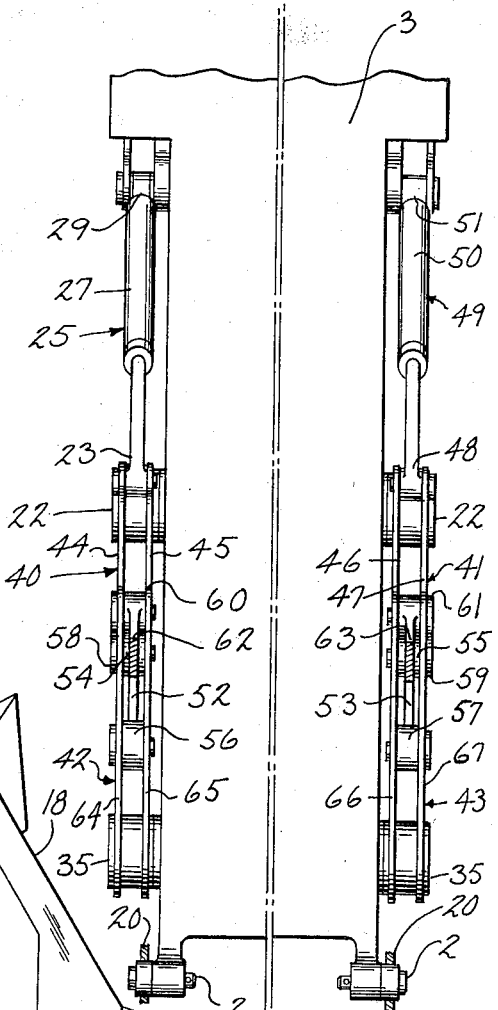

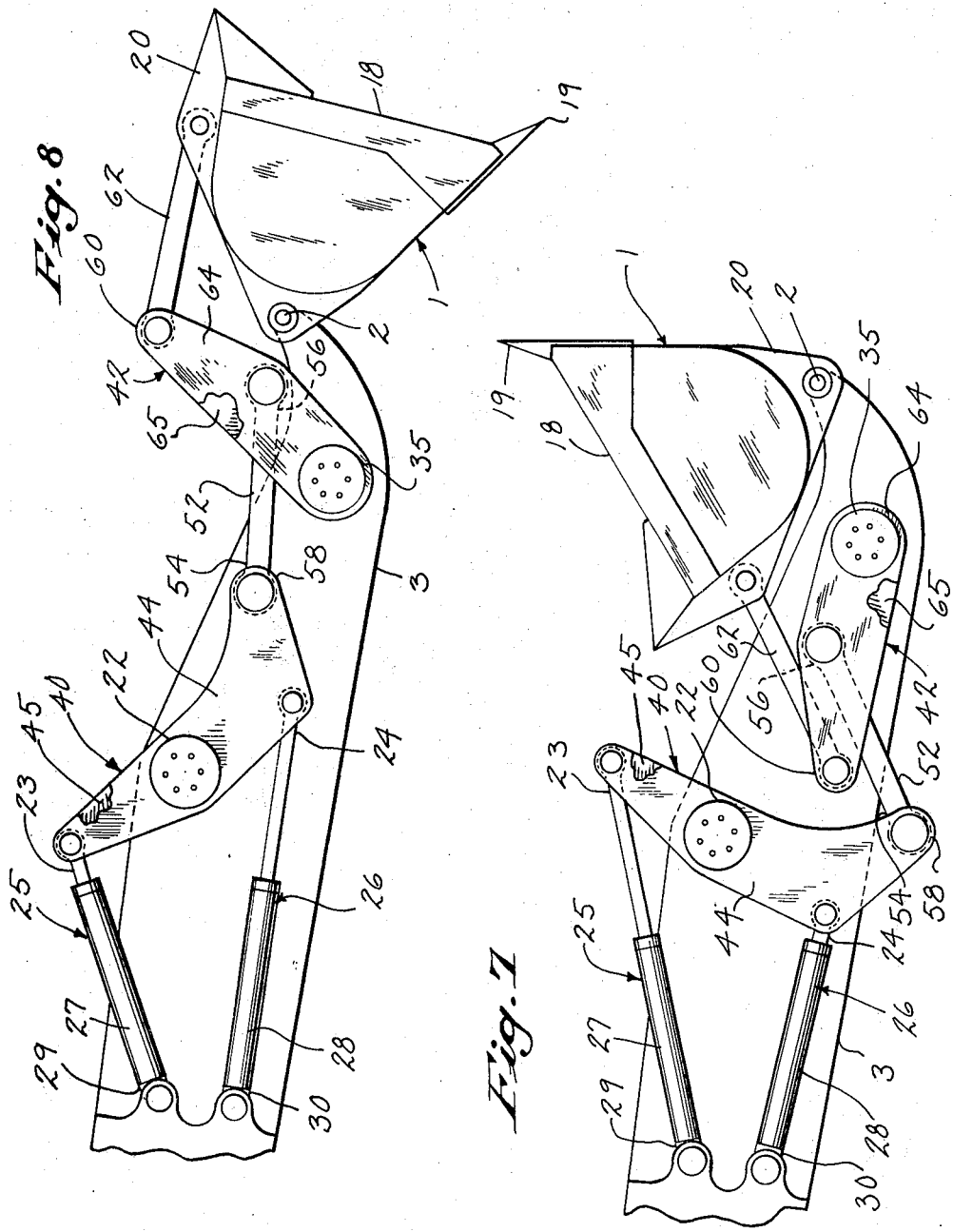

A quarry shovel having a boom pivoted on the front of its revolving frame with a bucket handle pivoted on the end of the boom employs the invention to wrist the bucket on the end of the bucket handle. In the wristing mechanism, a compound lever is pivoted about its fulcrum on the bucket handle by a pair of hydraulic cylinders connected between opposite sides of its fulcrum and the bucket handle. A link connects the compound lever to the bent lever mounted on the bucket handle adjacent the bucket, and the bent lever is linked to the bucket.

United States Patent Office 3,506,145
Patented Apr. 14, 1970

3,506,145
WRIST ACTION MECHANISM FOR A MATERIAL HANDLING IMPLEMENT ON A POWER LOADER
Robert J. Rupert, South Milwaukee, Wis., assignor to Bucyrus-Erie Company, South Milwaukee, Wis., a corporation of Delaware
Continuation-in-part of application Ser. No. 683,174, Nov. 15, 1967. This application Oct. 23, 1968, Ser. No. 770,129
Int. Cl. E02f 3/30, 3/62, 3/75
U.S. Cl. 214—138                                    8 Claims

ABSTRACT OF THE DISCLOSURE

A quarry shovel having a boom pivoted on the front of its revolving frame with a bucket handle pivoted on the end of the boom employs the invention to wrist the bucket on the end of the bucket handle. In the wristing mechanism, a compound lever is pivoted about its fulcrum on the bucket handle by a pair of hydraulic cylinders connected between opposite sides of its fulcrum and the bucket handle. A link connects the compound lever to the bent lever mounted on the bucket handle adjacent the bucket, and the bent lever is linked to the bucket.

CROSS-REFERENCE TO RELATED APPLICATIONS

This is a continuation-in-part of the co-pending application of Robert J. Rupert for "A Wrist Action Mechanism for a Material Handling Implement on a Power Shovel," Ser. No. 683,174, filed on Nov. 15, 1967, now abandoned.

BACKGROUND OF THE INVENTION

The embodiment of the invention disclosed here was created for use on a quarry shovel, that is disclosed and claimed in a co-pending application, Ser. No. 663,277 on the invention of Tom Learmont, which was filed on Aug. 25, 1967, entitled "Power Shovel," and assigned to the same assignee as the present invention. To maximize the maneuverability and efficiency of loaders, the bucket, or other material handling implement, is pivoted on the end of the bucket handle to provide what is sometimes called "wrist action" for the bucket. A large arc of wrist action is desired for the material handling implement, and while in theory a large arc would be easily attained, in a practical embodiment, many problems arise which obstruct the attainable arc of wrist action. For the large size buckets there are no rotary motors of sufficient power and small enough size and weight to provide the wrist action, so linear motors are employed and this entails the necessity for levers and linkages. The levers and linkages must be retained in a relatively small spatial envelope so that they do not obstruct the movement of the bucket handle, and the size of the linear motors must be minimized to keep the power unit within practical size, weight and cost. Variable speed wristing action is desirable, and maximum moment is required at the teeth of the bucket in those bucket positions where most of the digging is done. In a quarry shovel the importance of the moment and the structural strength of the wrist mechanism can scarcely be exaggerated for quarry machines are subjected to extremely heavy digging.

It is, of course, old to pivot a bucket or dipper on the end of its handle, and when this has been done in the past, a linear drive system employing links and levers has been used to control the wristing action of the bucket or dipper. A recent example of this is shown in U.S. Patent No. 3,120,315 where a bell crank is pivoted on a bucket handle and has one arm linked to the bucket and the other arm connected to the end of the boom by a hydraulic cylinder. Years earlier, a similar mechanism was shown for wristing a dipper in U.S. Patent No. 1,547,533, where the movement of the bell crank was imparted by a rack and pinion arrangement connected to the pivot point of the dipper handle on the boom. Again more recently structures similar to those shown in the previously mentioned patents are also disclosed in U.S. Patent Nos. 3,239,083 and 3,259,259, and British Patent No. 1,035,-312. Hence, while wristing a material handling implement using linear motors, links and levers are broadly old, the development of a system capable of maximizing the travel of the wrist action and the moment of force at the desired bucket positions, of minimizing the spatial envelope as well as the size of the linear motors, and of providing multi-speed travel simultaneously in a single system has awaited the present invention.

SUMMARY OF THE INVENTION

The present invention relates to a wristing mechanism for a material handling implement on a loader, and more specifically it resides in the combination of an implement handle which has a material handling implement pivotally mounted on it, a first lever with its fulcrum on the implement handle, a power source connected to pivot the first lever about its fulcrum and a bent lever with its fulcrum also on the implement handle between the first lever and the material handling implement, and which has the bent lever linked to be driven by the first lever and to wrist the material handling implement about its pivotal mounting on the end of the implement handle.

The above structure can achieve a semi-circle wristing arc with sufficiently short levers and linkages that the overall spatial envelope required for the mechanism is only slightly larger than the profile of the bucket handle itself. This mechanism also permits the use of short stroke linear motors, which require correspondingly small amounts of fluid so that a hydraulic power unit may be employed that has relatively small fluid flow capacity. In this particular embodiment, the structure of the power shovel is such that the digging is done when the bucket is at an angle to the bucket handle between 45° and 90°, and the present invention permits leverage such that maximum moment on the teeth of the bucket is provided when the bucket is in those digging positions.

By making the first lever a compound lever, and utilizing two linear hydraulic motors, it is possible to provide a two-speed wrist action with a fixed capacity hydraulic power unit. This is done by driving with one of the cylinders, or with both together. If fast wrist action is required in either direction, the cylinder for that direction that operated under pressure on the rod end of its bore is utilized so that for any given volume of fluid flow greater cylinder travel is achieved. On the other hand, if greater wristing force or slower wristing action is desired both cylinders are operated simultaneously.

BRIEF DESCRIPTION OF THE DRAWINGS

In the drawings,
FIG. 1 is a side elevation of a quarry shovel embodying the present invention,
FIG. 4 shows the side elevations of FIGS. 2–3 and with the bucket pivoted beyond the point shown in FIG. 1
and FIG. 5 is a side elevation of the embodiment shown in FIGS. 2-4 with the bucket pivoted to the end of its arc at the greatest possible angle from the bucket handle.

FIG. 6 is a side elevation of a portion of a bucket handle and bucket with an alternative embodiment of the wrist action mechanism of the present invention, FIG. 7 is a side elevation of the embodiment shown in FIG. 6 with the bucket in its fully restricted position, FIG. 8 is a side elevation of the embodiment shown in FIG. 6 with the bucket pivoted to its dumping position, FIG. 9 is a top plan view of a portion of the bucket handle with the embodiment of the wrist action mechanism shown in FIG. 6.

DESCRIPTION OF THE PREFERRED EMBODIMENT

Figure 2:
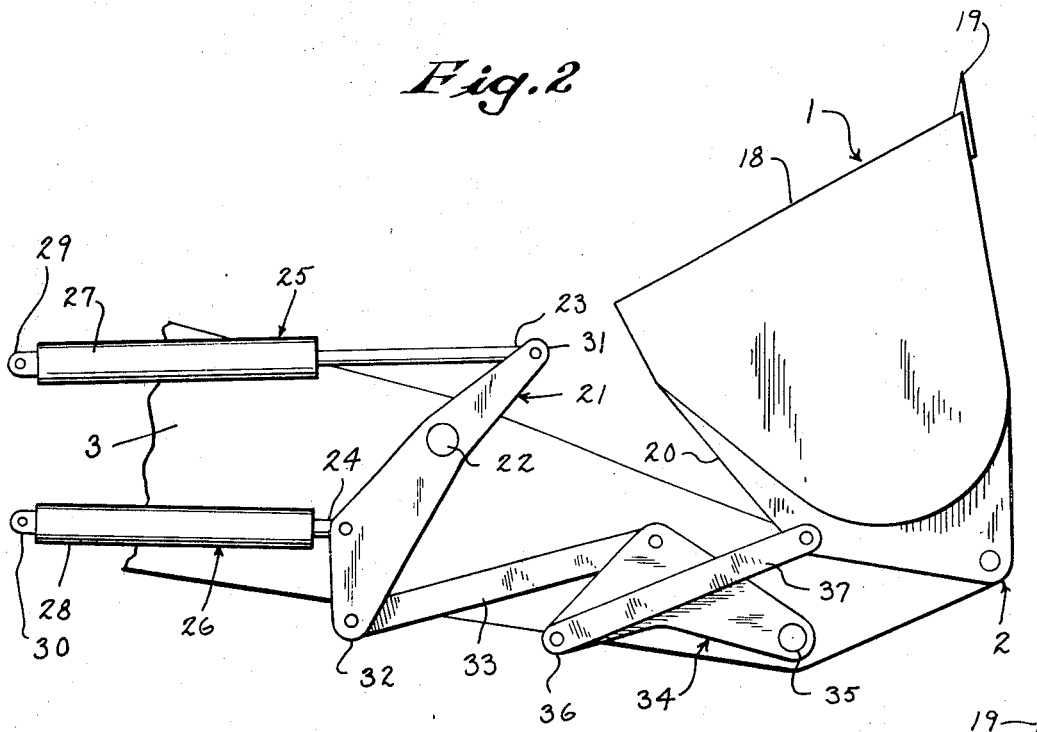
FIG. 2 is a side elevation of portion of the embodiment shown in FIG. 1 with the bucket drawn to the end of its wristing arc where it is at the smallest angle to the bucket handle.

The power loader in this embodiment is the quarry shovel shown in FIG. 1, and a bucket 1 is the material handling implement, which is pivotally mounted at the joint 2 on one end of an implement or bucket handle 3, which is pivotally supported intermediate its ends on an upper end 4 of a boom 5. The boom 5 is pivotally mounted on a lower end 6 at the front end of a revolving frame 7, which rides on a crawler type running gear 8, rotatably supported by a swing mechanism 9. The revolving frame 7 supports an A-frame 10 mounted behind the lower end 6 of the boom 5, and a cab 11 to house the prime mover with associated mechanism none of which is specifically illustrated in the drawing. The operator is also supported on top of the revolving frame 7. A hoist cable 12 passes around a hoist sheave 13 on top of the A-frame 10 and a hoist sheave 14 on top end 15 of the bucket handle 3 to hoist the bucket 1 by pivoting the bucket handle 3 about its mounting on the boom 5. Crowd force for the bucket 1 is provided by the crowd handle 16 supported on and driven by a crowd mechanism in the top of the A-frame 10 and having its forward end pivotally fastened to a crank 17 projecting from the bucket handle 3. Thus, reciprocation of the crowd handle 16 will toggle the bucket 1 inwardly and outwardly by articulation of the pivotal connection between the top of the boom 5 and the bucket handle 3. The structure and operation of this quarry shover is disclosed in detail in the above mentioned U.S. application, Ser. No. 663,277, filed on Aug. 25, 1967, and assigned to the same assignee as the present invention; refer to that application for more detail regarding this quarry shovel.

The bucket 1 shown in this embodiment is a 12-cubic-yard bucket, although smaller bucket—and even buckets with capacities of 36 cubic yards and more—are contemplated. As shown in the drawing, the bucket 1 has a forward opening mouth 18 with teeth 19 on the lower, digging edge of the mouth 18 of the bucket 1. A number of spaced apart parallel supporting ribs 20 are welded about the outside of the back and top walls of the bucket 1 to strengthen the bucket 1 and to provide processes for the attachment of linkages and for the joint 2. Only one of the ribs 20 can be seen in side elevation, though a plurality would be visible from the top. Similarly, the side elevations of the attached drawings show only one-half of the wristing mechanisms employed on this quarry shovel, the other half being mounted on the opposite side of the bucket handle 3 and being otherwise identical to the half shown here. Hence, it will be understood that the description of the half of the wristing mechanism to follow will apply equally well to the other half which is not shown, and that in the practical, commercial embodiments, duplicates of all elements described here appear on the opposite sides of the bucket handles 3 to wrist the buckets 1 about the joints 2.

A first lever 21 of the wrist mechanism is a compound lever which is pivotally mounted on a fulcrum 22 on the bucket handle 3 between the joint 2 at the end of the bucket handle 3 and the pivotal mounting of the bucket handle 3 on the upper end 4 of the boom 5. The fulcrum 22 may be any conventional type of pivotal mounting capable of sustaining the forces being exerted about it. On opposite sides of the fulcrum 22, and equidistant from the fulcrum 22, rod ends 23 and 24 of linear hydraulic actuators 25 and 26 are pivotally fastened to the compound level. The linear hydraulic actuators 25 and 26 are the power source for wristing the bucket 1 about the joint 2, and they have cylinders 27 and 28, respective blind ends 29 and 30 of which are anchored side by side to the bucket handle 3 just below the pivotal mounting of the bucket handle 3 on an upper end 4 of the boom 5. The compound lever 21 has an anterior end 31 that projects forwardly when the bucket handle 3 is vertical and is fastened to the rod end 23 of the linear hydraulic actuator 25, and a posterior end 32 that projects rearwardly when the bucket handle 3 is vertical to which an upper end of a lever link 33 is pivotally fastened.

The link 33 has its lower end pivotally fastened to a third class bent lever 34. One end of the bent lever 34 is secured to its fulcrum 35 on the bucket handle 3 between the joint 2 and the fulcrum 22 of the compound lever 21. And this fulcrum 35 may be any type of pivotal mounting adapted to withstand the forces exerted on it in the particular embodiment. Opposite the fulcrum 35 is a swinging end 36 of the bent lever 34 and this is connected to one of the ribs 20 on the bucket 1 by means of a bucket link 37, the ends of which are pivotally connected respectively to the swinging end 36 of the bent lever 34 and the rib 20 of the bucket 1.

Each of the linear actuators 25 and 26 has an 8-inch bore with a 4-inch rod, a 54-inch maximum stroke and a 49-inch working stroke. The rod ends 23 and 24 are each connected to the compound lever 21, 31 inches from the center of its fulcrum 22 and the centers of the blind ends 29 and 30 are mounted 37¾ inches apart. An angle of 22½° separates a line from the center of the fulcrum 22 on the compound lever 21 to the posterior end 32 of the compound level 21, which may be called the "load arm," and a line from the center of the fulcrum 22 to the mounting of the rod end 24, the former line being 48 inches long, which is one of the two "force arms" of the compound lever 21. Hence, both the first class lever from the rod end 23 of the outer actuator 25 to the fulcrum 22, which is the other force arm, to the link 33 at the posterior ends 32, and the third class lever from the rod end 24 of the inner actuator 26 to the lever link 33 at the posterior end 32 of the compound lever 21, are bent levers and the ratios of both bent levers are such as to sacrifice mechanical advantage for length of travel. The linear hydraulic actuators 25 and 26 are mounted non-parallel so as to fit on the side of the bucket handle 3.

The second or bent lever 34 also has a load arm, which is an imaginary line from the fulcrum 35 to the bucket link 37, and a force arm which is an imaginary line from the fulcrum 35 to the lever link 33. The lever link 33 joining the posterior end 32 of the compound lever 21 with the bent lever 34 in the same embodiment is 77⅜ inches long. The straight line distance of the lower end of the lever link 33, or the force, to the fulcrum 35 of the bent lever 34 is 40 inches, and the straight line distance from the upper end of the bucket link 37 or the load to the fulcrum 35 of the bent lever 34 is 37 inches to further extend the length of wristing travel of the bucket 1 relative to the lengths of the stroke of the linear hydraulic actuators 25 and 26. As is characteristic of bent levers, the mechanical advantage available against the load varies as the lever is pivoted, because the moment arms change. Hence, the present invention not only achieves, in this embodiment, a 170° wrist travel, but obtains maximum mechanical advantage within the range of angles of 45° to 90° between the bucket 1 and the bucket handle 3 (the maximum advantage appearing at approximately 75°) in which range all of the digging forces are applied by this excavator. When the bucket 1 has reached the end of the desired digging stroke and is hoisted up into a dumping position, then the value of the extended travel is realized for dumping the bucket 1 and although there is a substantially less mechanical advantage provided in the dumping attitudes of the bucket 1, none is needed.

Figure 3:
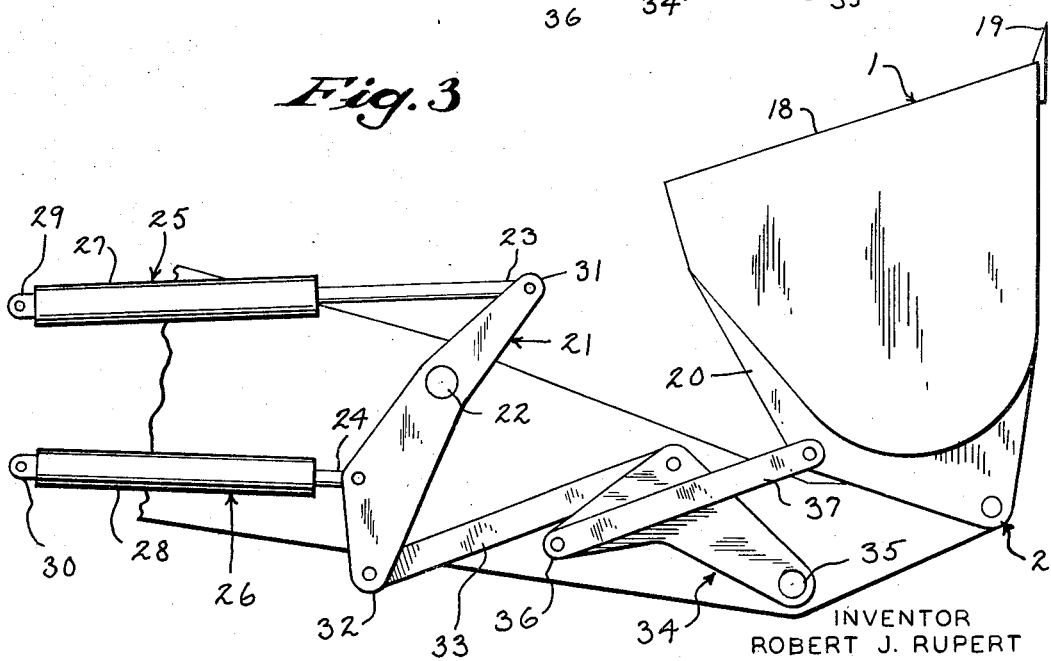
FIG. 3 is a side view of the embodiment shown in FIG. 2 with the bucket pivoted to a position between the positions shown in FIGS. 1 and 2.

In the drawings, FIG. 2 illustrates the bucket 1 at the end of its travel where it is at the sharpest angle with respect to the bucket handle 3, where the lower linear hydraulic actuator 26 is completely retracted to the end of its working stroke and the upper hydraulic actuator 25 is fully extended to the end of its working stroke. As the linear hydraulic actuators 25 and 26 are actuated from those extreme positions, the compound lever 21 is rotated about its fulcrum 22 toward the next position shown in FIG. 3 where the lever link 33 between the compound lever and the bent lever passes beneath the junction of the bucket link 37 to the bent lever 34. As actuation of the cylinders continues in the same direction the members move toward the position shown in FIG. 1 where the bucket link 37 is passing over the junction of the lever link 33 with the bent lever 34. As the bucket 1 continues to pivot about the joint 2 it moves into the position shown in FIG. 4, and finally to its extreme position shown in FIG. 5.

To accommodate the full length of travel of the bent lever 34 and the two links 33 and 37 of the first embodiment, the links 33 and 37 are mounted on opposite sides of the bent lever 34. Of course, if the bent lever 34 is fabricated in a box structure, for example, one link 33 or 37 could be attached inside of it and the other link 37 or 33 on the outside. This laterally offset mounting of the links 33 and 37, is used to permit one of the links 33 or 37, at least to pass across the attachment of the other link 37 or 33 to the bent lever 34 in the course of normal wristing action of the bucket 1.

If slow speed, or high power wristing is desired in moving the bucket 1 from the position shown in FIG. 2 to that of FIG. 5, both actuators 27 and 28 are simultaneously actuated. But if high speed wristing movement in the same direction is required, the upper actuator 25 is utilized so that the fluid will act in the smaller capacity rod end bore of its cylinder 27. Applying the same reasoning to wristing in the opposite direction and the lower actuator 28 is used for high speed movement. Thus two speed wrist action is available with a constant or fixed capacity power unit. A third, intermediate speed could be obtained by driving with a single cylinder that is operating on the blind side of its piston.

The second embodiment of the invention differs from the first embodiment in that the second embodiment has a pair of first levers 40 and 41 on opposite sides of the bucket handle 3 and second levers 42 and 43 of different construction and different configuration from the corresponding first levers 21 and the second lever 34 in the first embodiment. The pair of first levers 40 and 41 in the second embodiment can both be seen in FIG. 9, and they are identical except that they are mounted on opposite sides of the bucket handle 3. The first levers 40, 41 are compound levers as in the first embodiment, but they are constructed to have two lever blades 44 and 45, 46 and 47, respectively, between which the rod end 23, 24 and 48 of the linear hydraulic actuators 25, 26 and 49 are pivotally mounted so that the force applied to the first levers 40 and 41 is balanced. The linear hydraulic actuator 49, which is visable in FIG. 9, is identical to the linear hydraulic actuator 25 in that it has a cylinder 50 with a blind end 51 pivotally mounted to the bucket handle 3 on the opposite sides of the bucket handle 3 from the linear hydraulic actuator 25. A fourth linear hydraulic actuator is not shown in these drawings, but it is mounted beneath the linear hydraulic actuator 49 on the same side of the bucket handle 3 and is identical to the linear hydraulic actuator 26 on the opposite side of the bucket handle 3.

The load on the first levers 40 and 41 is transmitted by lever links 52 and 53 on opposite sides of the bucket handle 3 which have anterior ends 54 and 55, respectively, connected to the second levers 42 and 43 and posterior ends 56 and 57, respectively connected to the load ends 58 and 59 of the first levers 40 and 41. The lever links 52 and 53 constitute the force for the second levers 42 and 43, respectively, which, like their counter parts 34 in the first embodiment, are third class levers 42 and 43. The second levers 42 and 43 are mounted on the fulcrum shaft 35 as in the first embodiment and have their load ends 60 and 61, respectively, connected to the bucket 1 by respective bucket links 62 and 63 one end of which is pivotally fastened to the ribs 20 of the bucket 1 and the other ends of which are pivotally fastened to the load ends 60 and 61, respectively, of the second levers 42 and 43. Similarly to the first levers 40 and 41, the second levers 42 and 43 are made up of respective lever plates 64 and 65, 66 and 67 between which the ends of the lever links 52 and 53 and the bucket links 62 and 63 are mounted so that the forces on the second levers 42 and 43 are balanced.

As was mentioned, the configuration of the first levers 40 and 41 and the second levers 42 and 43 are also somewhat different from the configurations of the first lever 21 and the second lever 34 in the first embodiment. The angle between the force arm and the load arm on the load side of the fulcrum 22 of the force levers, 41 (only one is visible in the drawing) of the second embodiment is less than the angle between the force arm and the load arm on the load side of the fulcrum 22 in the first embodiment. By the term "force arm" reference is made to an imaginary line between the rod end 24 of the lower linear hydraulic actuator 26 and the fulcrum 22, and the term "load arm" is understood as an imaginary line between the load ends 58 and 59, respectively, of the first levers 21, 40 and 41 and the fulcrums 22. Also, the angle between the force arm and the load arm in the second levers 42 and 43 is substantially less than the corresponding angle between the force arm and the load arm of the second lever 34 in the first embodiment. In the context of the second levers 34, 42 and 43, the term "force arm" refers to an imaginary line between the anterior ends 54 and 55 of the lever links 33, 52 and 53 and the fulcrums 35, and the term "load arm" is defined by an imaginary line between the fulcrums 35 and the load ends 36, 60 and 61. By reducing the size of the mentioned angles between the respective load arms and the force arms in the first and second levers 40, 41 and 42 and 43, the lever links 33, 52 and 53 do not cross the respective bucket links 37, 62 and 63 at any point in the cycle of bucket travel. Although for the same length of levers some sacrifice is made in the length of the wristing arc of the bucket 1 about is pivotal mounting 2 when the structure of the second embodiment is used, that structure will sustain greater digging shocks and loads because the forces of the links 52, 53 and 62, 63 on the respective leavers 40, 41 and 42, 43 are balanced rather than offset as in the first embodiment.

The operation of the second embodiment is essentially the same as that of the first embodiment except for the difference noted above. This difference is illustrated in FIGS. 7 and 8 which respectively shows the bucket 1 at opposite extreme ends of its arc of wrist travel. In FIG. 8 the bucket 1 is extended to its extreme dump position, and in FIG. 7 the bucket 1 is retracted about its pivotal mounting 2 to the position it would have at the beginning of its crowd movement when it is pulled up close to the front of the revolving frame 7. FIG 6 illustrates the bucket 1 pivoted to an intermediate position between the two extremes shown in FIGS. 7 and 8, which is approximately the position that the bucket 1 would be in about half way through its crowd movement.

It may be noted that any one of the salient objects and advantages of the present invention, taken alone, may be achieved without using the invention. For example, any desired length of arc of the bucket 1 about the joint 2 is attainable with a single level, provided that the lever is long enough, but if the lever is long it will strike the bank before the teeth 19 on the mouth 18 of the bucket 1 reaches the bank, making the entire structure useless. The mechanical advantage achieved by the present invention when the bucket is between 45° and 90° angle points where the digging is done, may also be achieved by more common devices, if the length of travel is sufficiently restricted. Another common expedient for achieving one or another of these advantages is by simply extending the length of stroke of the linear hydraulic actuators 25 and 26, but by so doing, disadvantageous mounting of the actuators is required and the concomitantly large fluid requirement for operating such an actuator necessitates a much larger, and much more expensive hydraulic power unit. Multi-speed wristing action is also possible using a variable capacity hydraulic power unit, but at much greater expense. It is the particular accomplishment of the present invention to achieve all of these advantages simultaneously in a single structure.

The embodiments of the invention shown and described here was created for use on a specific quarry shovel of certain size, operating perameter and characteristics. Accordingly, the invention is not limited to this specific embodiment but is intended for application of a broad range of machines utilizing different types of material handling implements for different purposes with entirely different types of movements. Therefore it is to be understood that the invention is not limited to the specific structure described here but rather is set forth in the claims that follow.

I claim:

1. A wristing mechanism for a material handling implement on a loader comprising the combination of
   an implement handle having a material handling implement pivotally mounted on its end and being adapted to impart horizontal and vertical movements to said material handling implement;
   a first lever having its fulcrum on said implement handle;
   a wrist action power source connected to pivot said first lever about its fulcrum;
   a bent lever having its fulcrum on said implement handle between said first lever and said material handling implement, and said bent lever being a third class lever;
   a first link connecting said first lever to said bent lever to pivot said bent lever;
   said first lever being a compound lever forming both a first class and third class lever with said first link;
   and a second link connecting said bent lever to said material handling implement at a point spaced from the pivotal mounting of said material handling imment on said implement handle.

2. A wristing mechanism for a material handling implement as set forth in claim 1 wherein
   said wrist action power source includes two linear actuators connected to said first lever on opposite sides of its fulcrum.

3. A wristing mechanism for a material handling implement on a loader as set forth in claim 2 wherein
   said linear actuators are anchored to said implement handle.

4. A wristing mechanism for a material handling implement on a loader as set forth in claim 3 wherein
   said both first class and said third class levers of said compound lever are also bent levers.

5. A wristing mechanism for a material handling implement on a loader as set forth in claim 1 wherein
   said second link passes across the connection of said first link to said bent lever as said bent lever is pivoted about its fulcrum.

6. A wristing mechanism for a material handling implement on a loader as set forth in claim 1 wherein
   said first link passes across the connection of said second link to said bent lever as said bent lever is pivoted about its fulcrum.

7. A wristing mechanism for a material handling implement on a loader as set forth in claim 1 wherein
   said first link crosses the connection of said second link to said bent lever when said bent lever pivots about its fulcrum
   and said second link crosses the connection of said first link to said bent lever as said bent lever pivots about its fulcrum.

8. A wristing mechanism for a material handling implement on a load as set forth in claim 4 wherein
   said first lever has two spaced apart lever plates and said linear hydraulic actuators and said first link are positioned between said lever plates at the connections to said first lever;
   and said second lever has two spaced apart lever plates and said first and second links are positioned between said lever plates at the connections to said second lever.

References Cited

UNITED STATES PATENTS

| 3,224,607 | 12/1965 | Brown | 214—776 |
| 3,259,259 | 7/1966 | Metailler | 214—138 |
| 3,422,975 | 1/1969 | Crisp | 214—147 |

HUGO O. SCHULZ, Primary Examiner

U.S. Cl. X.R.

214—776, 778